US009684459B2

(12) United States Patent
Kondo et al.

(10) Patent No.: US 9,684,459 B2
(45) Date of Patent: Jun. 20, 2017

(54) MEMORY SYSTEM

(71) Applicant: Kabushiki Kaisha Toshiba, Minato-ku (JP)

(72) Inventors: Nobuhiro Kondo, Yokohama (JP); Yu Nakanishi, Yokohama (JP); Akihiko Fukui, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/643,283

(22) Filed: Mar. 10, 2015

(65) Prior Publication Data
US 2016/0139822 A1  May 19, 2016

Related U.S. Application Data

(60) Provisional application No. 62/080,579, filed on Nov. 17, 2014.

(51) Int. Cl.
G06F 12/00 (2006.01)
G06F 3/06 (2006.01)
G06F 12/0862 (2016.01)

(52) U.S. Cl.
CPC .......... G06F 3/0611 (2013.01); G06F 3/0659 (2013.01); G06F 3/0679 (2013.01); G06F 12/0862 (2013.01); G06F 2212/6026 (2013.01)

(58) Field of Classification Search
CPC .... G06F 3/0611; G06F 3/0659; G06F 3/0679; G06F 12/0862; G06F 2212/6026
See application file for complete search history.

(56) References Cited

U.S. PATENT DOCUMENTS

| 5,761,708 | A | * | 6/1998 | Cherabuddi | G06F 13/161 |
| | | | | | 710/57 |
| 6,965,967 | B2 | | 11/2005 | Takaichi | |
| 7,516,290 | B2 | | 4/2009 | Machimura | |
| 7,774,550 | B2 | | 8/2010 | Nomura et al. | |
| 2005/0154825 | A1 | * | 7/2005 | Fair | G06F 3/0611 |
| | | | | | 711/113 |
| 2014/0052928 | A1 | * | 2/2014 | Shimoi | G06F 12/0862 |
| | | | | | 711/137 |

FOREIGN PATENT DOCUMENTS

| JP | 2001-285805 | 10/2001 |
| JP | 2007-94835 | 4/2007 |
| JP | 2007-249457 | 9/2007 |

* cited by examiner

*Primary Examiner* — Kalpit Parikh
(74) *Attorney, Agent, or Firm* — Oblon, McClelland, Maier & Neustadt, L.L.P.

(57) ABSTRACT

According to one embodiment, there is provided a memory system including a nonvolatile memory, a host interface, and a controller. The host interface is configured to receive a first read command including a logical address to access the nonvolatile memory from a host system. The controller is configured to, when a size of read data requested in the first read command matches a predetermined data size, execute a process according to a second read command including a logical address sequential to the logical address included in the first read command before the host interface receives the second read command.

5 Claims, 8 Drawing Sheets

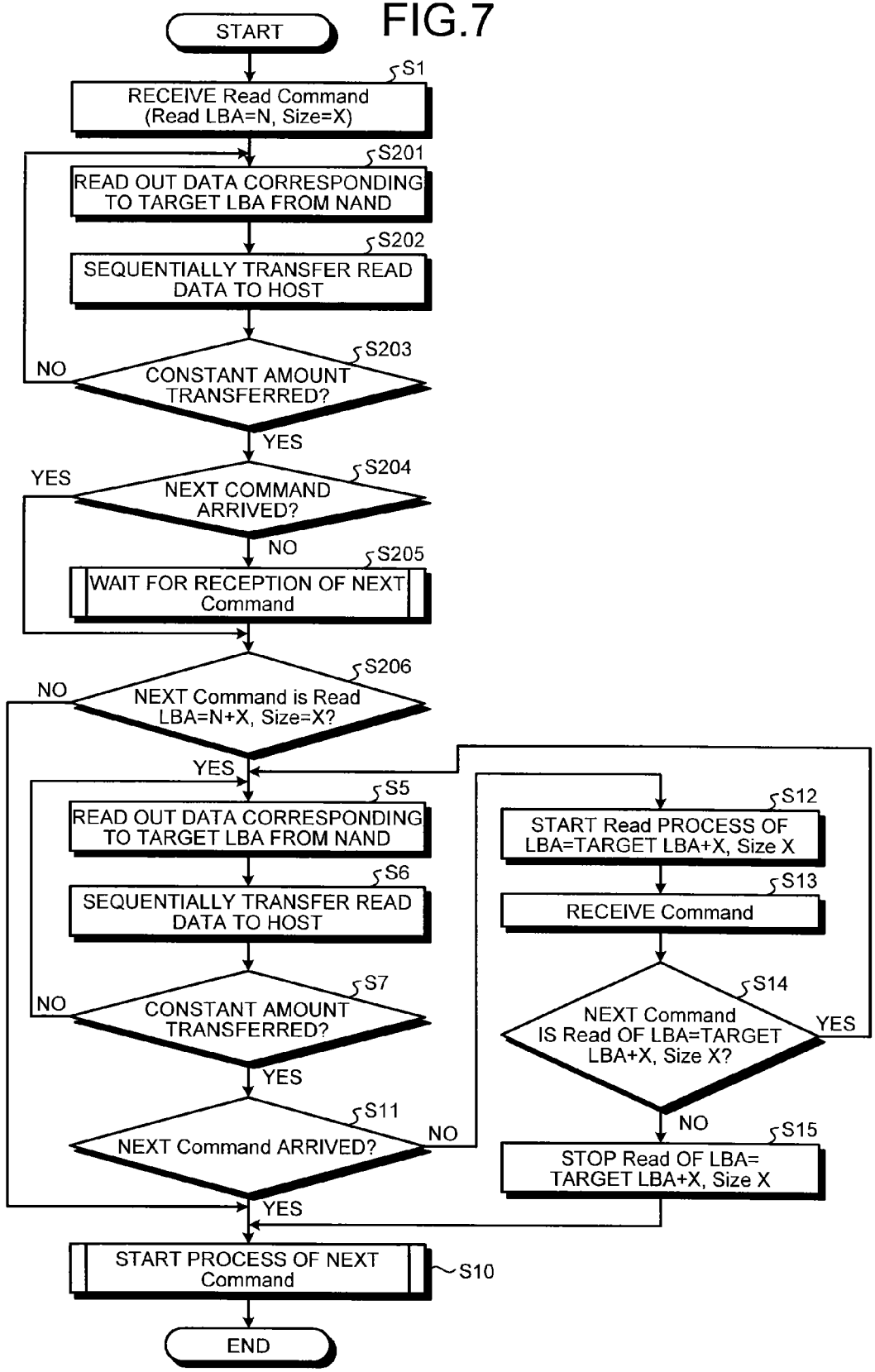

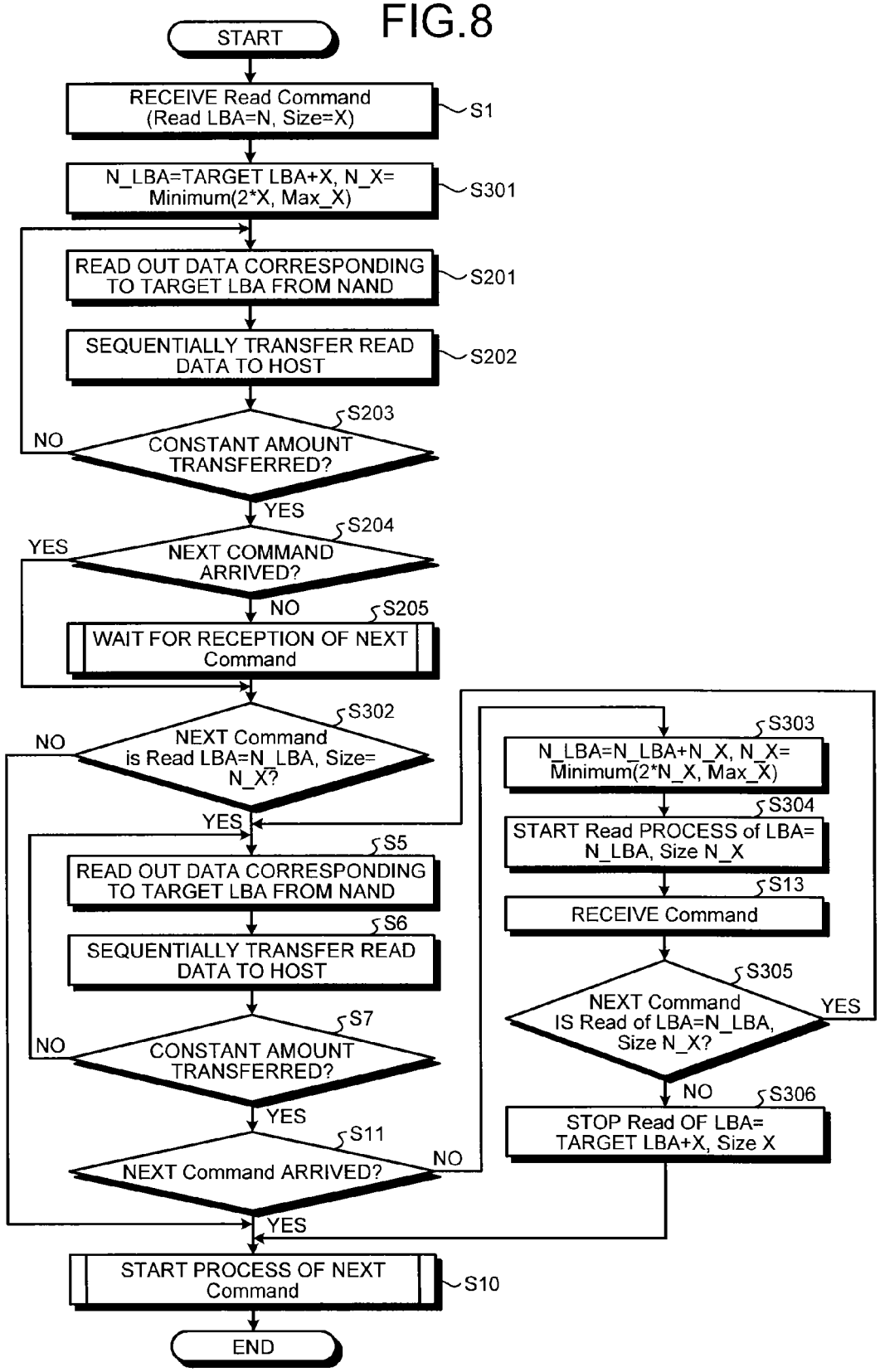

MEMORY SYSTEM

CROSS-REFERENCE TO RELATED APPLICATIONS

This application is based upon and claims the benefit of priority from U.S. Provisional Application No. 62/080,579, filed on Nov. 17, 2014; the entire contents of which are incorporated herein by reference.

FIELD

Embodiments described herein relate generally to a memory system.

BACKGROUND

In a memory system such as an SSD, and the like that uses NAND type flash memory, when a command is received from a host system, the process according to the received command is carried out. In this case, in the memory system, it is desirable to reduce the time from the reception of the command until the completion of the process according to the command.

BRIEF DESCRIPTION OF THE DRAWINGS

FIG. 7 is a flowchart illustrating an operation of a memory system according to a second embodiment;
and
FIG. 8 is a flowchart illustrating an operation of a memory system according to a third embodiment.

DETAILED DESCRIPTION

In general, according to one embodiment, there is provided a memory system including a nonvolatile memory, a host interface, and a controller. The host interface is configured to receive a first read command including a logical address to access the nonvolatile memory from a host system. The controller is configured to, when a size of read data requested in the first read command matches a predetermined data size, execute a process according to a second read command including a logical address sequential to the logical address included in the first read command before the host interface receives the second read command.

Exemplary embodiments of a memory system will be explained below in detail with reference to the accompanying drawings. The present invention is not limited to the following embodiments.

First Embodiment

Figure 1:
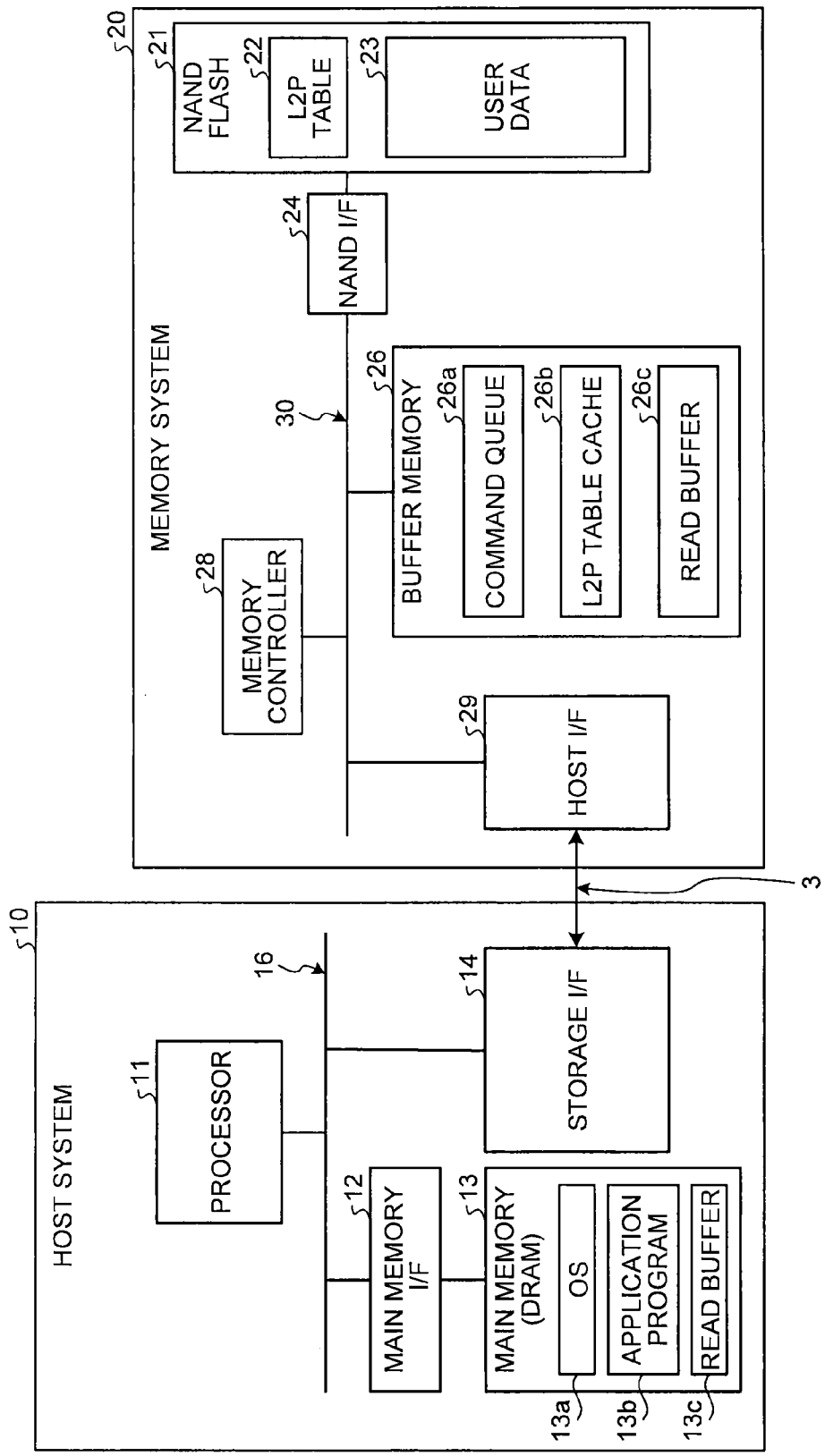
FIG. 1 is a block diagram illustrating a configuration of a memory system according to a first embodiment.

A memory system 20 according to a first embodiment will be described using FIG. 1. FIG. 1 is a view illustrating a configuration of the memory system 20. The memory system 20 is connected to a host system 10 by way of a communication path 3, and functions as an external storage device of the host system 10. The memory system 20 is flash memory for incorporating application complying with the UFS (Universal Flash Storage) standard and the eMMC (embedded Multi Media Card) standard, for example, an SSD (Solid State Drive), and the like. The host system 10 is, for example, a personal computer, a portable telephone, an imaging device, and the like. The MIPI (Mobile Industry Processor Interface) M-PHY, for example, is adopted for the communication standard of the communication path 3. The host system 10 and the memory system 20 transmit and receive a packet complying with the UFS standard, for example, through the communication path 3.

The memory system 20 includes NAND flash memory (hereinafter referred to as NAND flash) 21 serving as nonvolatile memory, a NAND interface (NAND I/F) 24, a buffer memory 26, a memory controller 28, and a host interface (host I/F) 29.

The NAND flash 21 includes a memory cell array in which a plurality of memory cells is arrayed in a matrix form. Each memory cell can use an upper page and a lower page to enable a multivalued storage. The NAND flash 21 is configured by arraying a plurality of blocks, each being a unit of data erasure. Furthermore, each block is configured by a plurality of pages. Each page is a unit for write and read of the data. The NAND flash 21 is configured, for example, by a plurality of memory chips.

The NAND flash 21 stores, for example, management information and user data 23 of the memory system 20. The management information of the memory system 20 includes a logical-physical conversion table (L2P table) 22.

The logical-physical conversion table (L2P table) 22 is a piece of address conversion information corresponding a logical address (LBA: Logical Block Address), which is used when the host system 10 accesses the memory system 20, and a physical address (block address+page address+in-page storage position) in the NAND flash 21.

The NAND I/F 24 executes read/write of the data and the management information with respect to the NAND flash 21 based on control of the memory controller 28.

The buffer memory 26 includes, for example, a command queue 26a, an L2P table cache 26b, and a read buffer 26c. The command queue 26a queues a command (e.g., write command, read command, etc.) received from the host system 10. The L2P table cache 26b temporarily stores the logical-physical conversion table (L2P table) 22 when a logical-physical conversion process is carried out. The read buffer 26c temporarily stores the read data read out from the NAND flash 21 in accordance with the read command. In other words, the buffer memory 26 is used as a buffer for storing the data read from the NAND flash 21. The buffer memory 26 can also be used as a buffer for storing the data to write to the NAND flash 21. For example, the buffer memory 26 is configured by the SRAM, the DRAM, or the like, but may be configured by a register, and the like.

The host interface (host I/F) 29 is an interface for connecting with the host system 10. The host I/F 29 has a function of controlling the data transmission between a register in a storage I/F 14 of the host system 10 and the buffer memory 26 of the memory system 20.

The function of the memory controller 28 is realized with the firmware, and the memory controller 28 comprehensively controls each of the configuring elements in the memory system 20 connected to the bus 30.

The host system 10 includes a processor 11, a main memory interface 12, a main memory 13, the storage interface (storage I/F) 14, and a bus 16 that connects each of such configuring elements. The main memory I/F 12 is an interface for connecting the main memory 13 to the bus 16.

The main memory 13 is a main storage device accessible by the processor 11, where the DRAM (Dynamic Random Access Memory) is used in the present example. The main memory 13 includes a read buffer 13c. The read buffer 13c temporarily stores the read data transferred from the memory system 20 in accordance with the read command. The main memory 13 also stores, for example, an OS (Operating System) 13a and an application program 13b. The OS 13a functions as a control program of the host system 10. The application program 13b functions as a user application program that operates on the OS 13a.

The storage I/F 14 is an interface for connecting with the memory system 20. The storage I/F 14 executes data transfer control between the main memory 13 and the register in the storage I/F 14.

The processor 11 is a processor for controlling the operation of the host system 10, and executes the OS 13a loaded to the main memory 13. The OS 13a includes a device driver that controls the memory system 20. Upon receiving a read request with respect to the memory system 20 from the application program 13b on the OS 13a, the device driver issues a read command corresponding to the read request. The read command issued by the device driver includes a field for identifying the type of command (whether read or write), a field for specifying a head LBA, a field for specifying a size of the read data, and the like. The device driver transmits the issued read command to the memory system 20 via the storage I/F 14 and the communication path 3.

Figure 2:
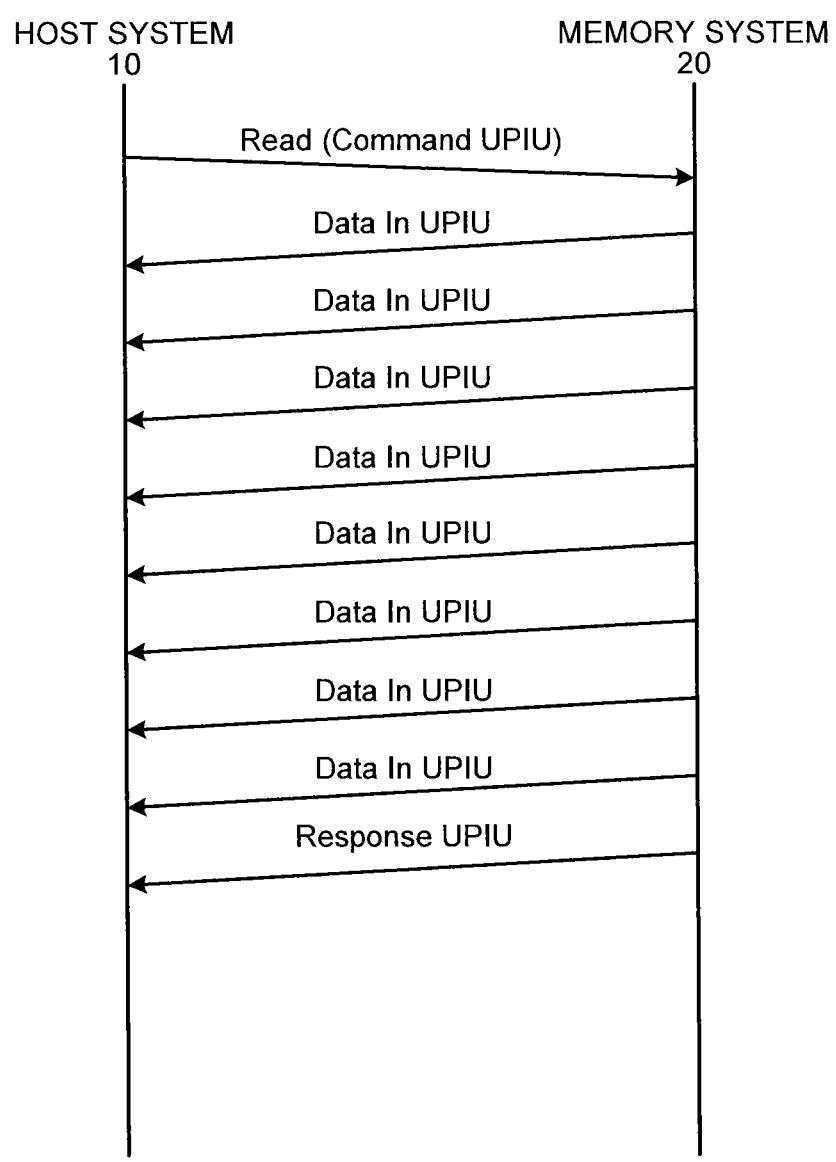
FIG. 2 is a timing chart describing a communication procedure of a read access from a host system to the memory system in the first embodiment.

As illustrated in FIG. 2, the read command and the read data are transmitted and received between the host system 10 and the memory system 20 as a packet complying with the UFS standard. FIG. 2 is a timing chart describing a communication procedure of a read access from the host system 10 to the memory system 20. The packet complying with the UFS standard will be referred to as UPIU (UFS Packet Information Unit). The UPIU is configured to include a header having a size of 32 bytes. For example, the header of the UPIU may be a Command UPIU, a Data In UPIU, a Ready To Transfer UPIU, a Data Out UPIU, and a Response UPIU. The header is followed by a payload, as necessary.

The Command UPIU is used for the read command. The Command UPIU may include an SCSI command. Whether the request of the Command UPIU is read or write and the specific information that specifies the access destination are defined within the SCSI command provided in the Command UPIU. The SCSI command provided in the Command UPIU is not limited to the command that requests for read and write. The Command UPIU may include an own command instead of the SCSI command.

First, the host system 10 transmits the read command having a format of the Command UPIU to the memory system 20. The read command includes the LBA of the access destination and the data size. When the read data is ready to be transmitted, the memory system 20 sequentially transmits small pieces into which read data has been broken for every transmittable size to the host system 10 using the Data In UPIU as the header. The size of the read data broken into small pieces may be the size determined by the memory system 20 within a range defined in the UFS standard. For example, if the size of the read data requested in the read command is 256 KB, the memory system 20 divides the read data of 256 KB for every 32 KB, and returns eight pieces of Data In UPIU as the read data. After transmitting all the read data broken into small pieces to the host system 10, the memory system 20 transmits the Response UPIU to the host system 10.

Consider a case in which the memory controller 28 of the memory system 20 starts the process according to the read command with the reception of the read command from the host system 10 as a trigger. In this case, the time from when the read command is received until the process according to the read command is completed tends to become long in the memory system 20, and the time from when the application program 13b makes a read request until all the requested read data are received tends to become long in the host system 10.

Thus, in the present embodiment, the read command assumed to arrive from the host system 10 is predicted and the process according to the read command is speculatively started in the memory system 20 to reduce the time from the reception of the read command until the completion of the process thereof.

Specifically, the memory system 20 determines whether the read access from the host system 10 to the memory system 20 is a sequential read access or a normal read access. In the sequential read access, a plurality of read commands including the sequential logical addresses (LBA) is sequentially received by the memory system 20 from the host system 10. In this case, a size of the read data requested in the read command is increased in a step wise manner at a predetermined constant increase rate up to a maximum size, and the size of the read data requested in the read command is maintained at the maximum size after reaching the maximum size.

The size of the read data requested in the first read access may change depending on the size of the data read requested to the OS 13a by the application program 13b.

The predetermined constant increase rate is an increase rate determined according to the specification of the OS 13a, and is K times, K being an integer of greater than or equal to two. For example, when the OS 13a is the Linux (registered trademark), the predetermined constant increase rate is two times.

The maximum size is determined according to the specification of the OS 13a. The maximum size is, for example, 128 KB or 512 KB.

Figure 3:
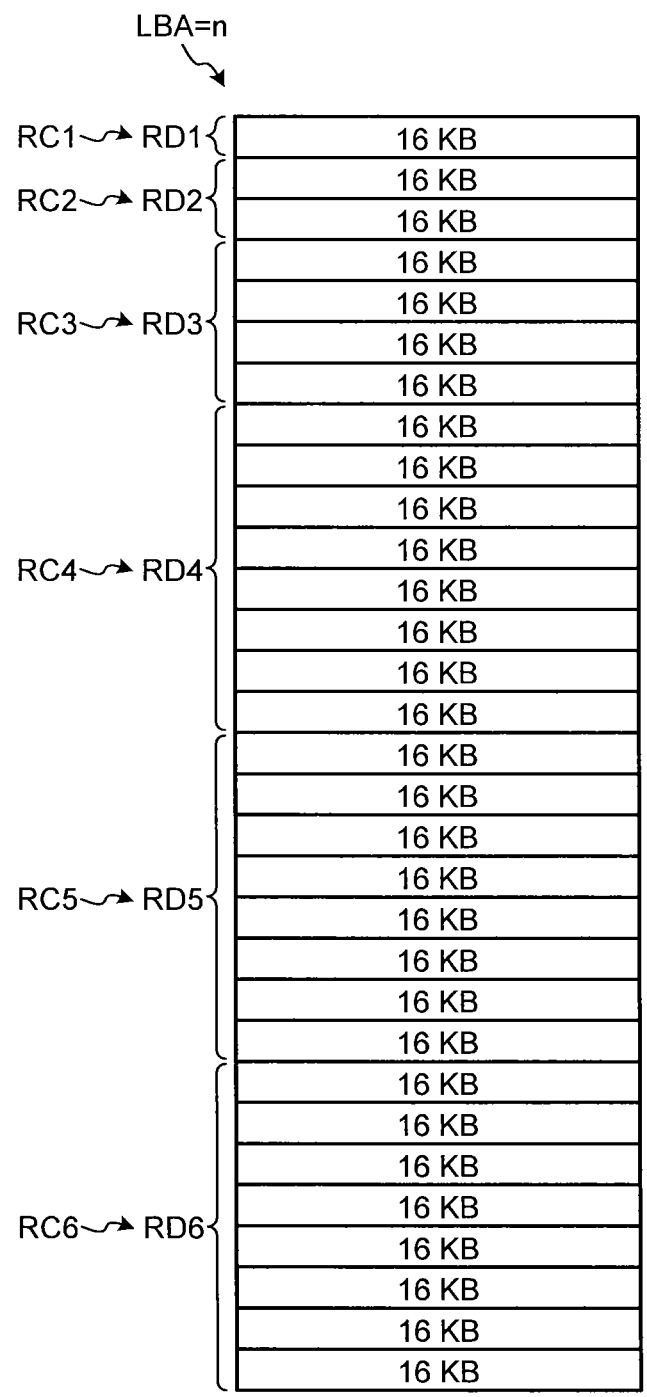
FIG. 3 is a view illustrating a sequence of a sequential read access from the host system to the memory system in the first embodiment.

For example, if the size of the data read requested to the OS 13a first by the application program 13b is 16 KB and the maximum size is set to 128 KB, the access as illustrated in FIG. 3 is carried out. FIG. 3 is a view illustrating a sequence of the sequential read access from the host system 10 to the memory system 20. The following accesses are carried out assuming the block size of the LBA is 4 KB.

In the first read access, a read command RC1 requesting for read data RD1 having Size=16 KB from the head LBA=n is issued. The issued read command RC1 is transmitted from the host system 10, and received by the memory system 20.

In the second read access, a read command RC2 requesting for read data RD2 having Size=32 KB from the head LBA=n+16 KB=n+0x4 is issued. The issued read command RC2 is transmitted from the host system 10, and received by the memory system 20.

In the third read access, a read command RC3 requesting for read data RD3 having Size=64 KB from the head LBA=(n+0x4)+32 KB=n+0xc is issued. The issued read command RC3 is transmitted from the host system 10, and received by the memory system 20.

In the fourth read access, a read command RC4 requesting for read data RD4 having Size=128 KB from the head LBA=(n+0xc)=64 KB=n+0x1c is issued. The issued read command RC4 is transmitted from the host system 10, and received by the memory system 20.

In the fifth read access, a read command RC5 requesting for read data RD5 having Size=128 KB from the head LBA=(n+0x1c)+128 KB=n+0x3c is issued. The issued read command RC5 is transmitted from the host system 10, and received by the memory system 20.

In the sixth read access, a read command RC6 requesting for read data RD6 having Size=128 KB from the head LBA=(n+0x3c)+128 KB=n+0x5c is issued. The issued read command RC6 is transmitted from the host system 10, and received by the memory system 20.

In this case, if the maximum size (e.g., 128 KB in the example of FIG. 3) is known, determination can be made that the read access from the host system 10 to the memory system 20 is the sequential read access with the arrival of the access request of the read data RD4 of 128 KB such as the read command RC4. In other words, an expected maximum size can be set in the memory controller 28 in advance as a data size (predetermined data size) that becomes the condition for starting the speculative execution. When detecting that the size of the read data requested in the read command matches the condition for starting the speculative execution, the memory system 20 assumes that the read access from the host system 10 to the memory system 20 is the sequential read access, and starts a routine of the determining speculative operation.

Figure 4:
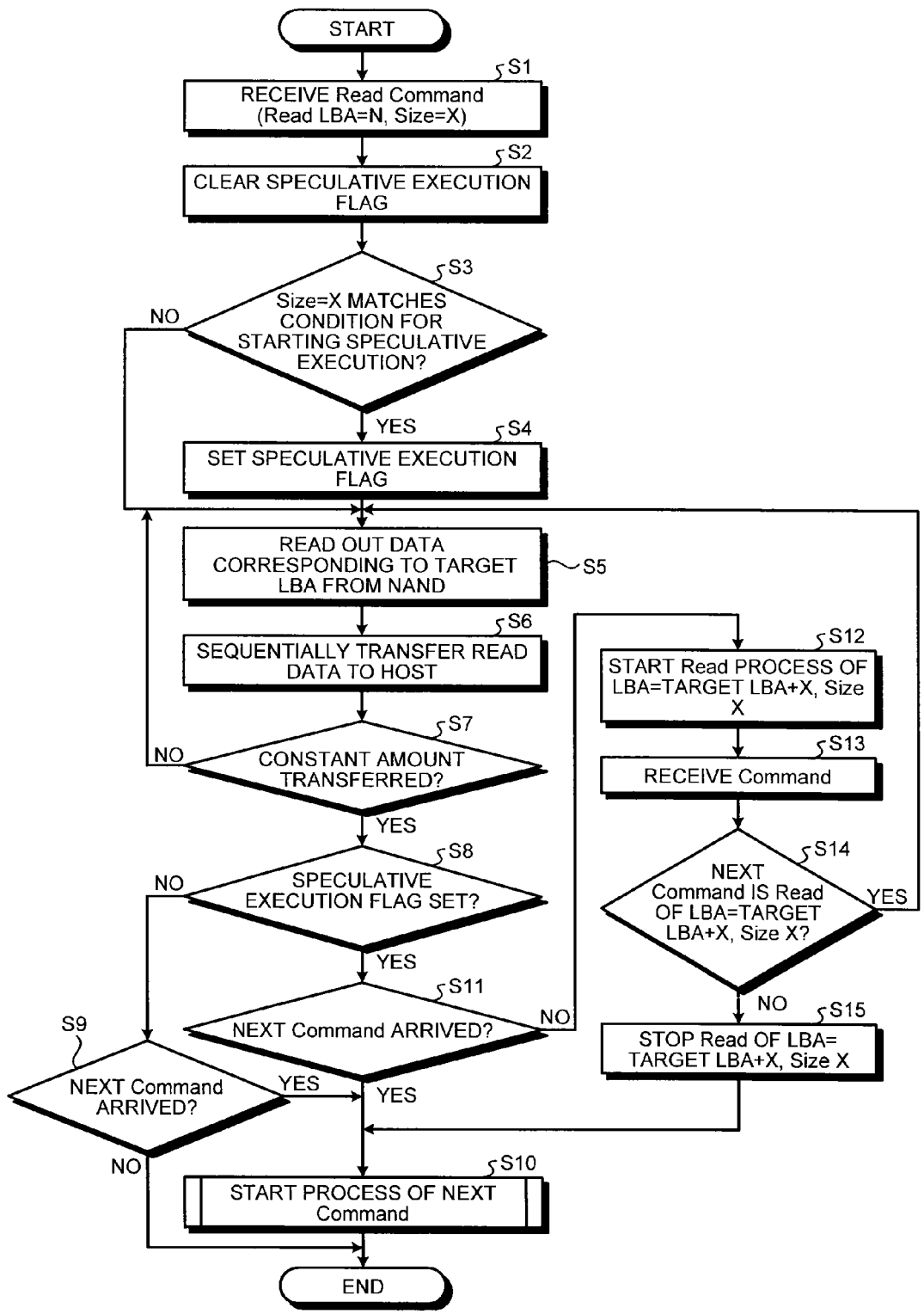
FIG. 4 is a flowchart illustrating an operation of the memory system according to the first embodiment.

More specifically, the memory system 20 carries out the operation illustrated in FIG. 4. FIG. 4 is a flowchart illustrating the operation of the memory system 20.

The read command (e.g., read command of head LBA=N, Size=X) received by the memory system 20 via the host I/F 29 is set in the command queue 26a of the buffer memory 26 by the host I/F 29 (S1). When the read command is in an executable state, the memory controller 28 clears a speculative execution flag and returns the value of the speculative execution flag to a default value (e.g., "0") (S2). The speculative execution flag may be held in the memory controller 28 or may be stored in the buffer memory 26. The memory controller 28 determines whether or not the size (Size=X) of the read data requested in the read command matches the condition (predetermined data size) for starting the speculative execution (S3).

If the size (Size=X) of the read data matches the predetermined data size (maximum size in the sequential read access) ("Yes" in S3), the memory controller 28 can determine that the read access from the host system 10 to the memory system 20 is the sequential read access. Thus, the memory controller 28 sets an active value (e.g., "1") to the speculative execution flag (S4).

If the size (Size=X) of the read data does not match the predetermined data size (maximum size in the sequential read access) ("No" in S3), the memory controller 28 determines that there is a possibility the read access from the host system 10 to the memory system 20 is not the sequential read access. Thus, the memory controller 28 proceeds the process to S5 with the value of the speculative execution flag remained set at the default value (e.g., "0").

The memory controller 28 accesses the NAND flash 21 through the NAND I/F 24, and transfers the logical-physical conversion table (L2P table) 22 from the NAND flash 21 to the L2P cache 26b. The memory controller 28 carries out an address resolution using the L2P table 22 transferred to the L2P cache 26b. In other words, the memory controller 28 acquires the physical address of the NAND flash 21 corresponded to the LBA (logical address) requested in the read command from the L2P table 22. The memory controller 28 then generates a read instruction including a physical address and provides the same to the NAND I/F 24 for the read data broken into small pieces for every transmittable size with respect to the size of the read data requested in the read command. The NAND I/F 24 reads the read data corresponding to the physical address from the NAND flash 21 and stores the same in the read buffer 26c (S5) in accordance with the read instruction. Thereafter, the memory controller 28 transmits (transfers) the read data stored in the read buffer 26c to the host system 10 via the host I/F 29 (S6).

Here, until all (constant amount) the read data broken into small pieces are transferred to the host system 10 ("No" in S7), the memory controller 28 repeats the readout of the read data (S5) to the read buffer 26c and the transfer of the read data (S6) to the host system 10. When all (constant amount) the read data broken into small pieces are transferred to the host system 10 ("Yes" in S7), the memory controller 28 determines whether or not the active value (e.g., "1") is set to the speculative execution flag (S8).

If the active value is not set to the speculative execution flag ("No" in S8), the memory controller 28 determines whether or not a next command arrived (S9). If the command is not queued in the command queue 26a, the memory controller 28 terminates the process assuming the next command has not arrived ("No" in S9). If the command is queued in the command queue 26a, the memory controller 28 causes the next command to be in an executable state assuming the next command arrived ("Yes" in S9), and starts the process according to the next command (S10). The memory controller 28 terminates the process when the process according to the next command is completed.

If the active value is set to the speculative execution flag ("Yes" in S8), the memory controller 28 determines whether or not the next command arrived (S11). If the command is queued in the command queue 26a, the memory controller 28 causes the next command to be in an executable state assuming the next command arrived ("Yes" in S11), and starts the process according to the next command (S10). The memory controller 28 terminates the process when the process according to the next command is completed.

If the command is not queued in the command queue 26a, the memory controller 28 speculatively executes a read command predicted to arrive next, assuming the next command has not arrived ("No" in S11). For example, the memory controller 28 starts a process according to a read command of head LBA='head LBA of the previous read command currently being executed (hereinafter referred to as target LBA)'+X, Size=X predicted to arrive next (S12). For example, if the target LBA=N, the memory controller 28 starts the process according to the read command of head LBA=N+X, Size=X.

Figure 5:
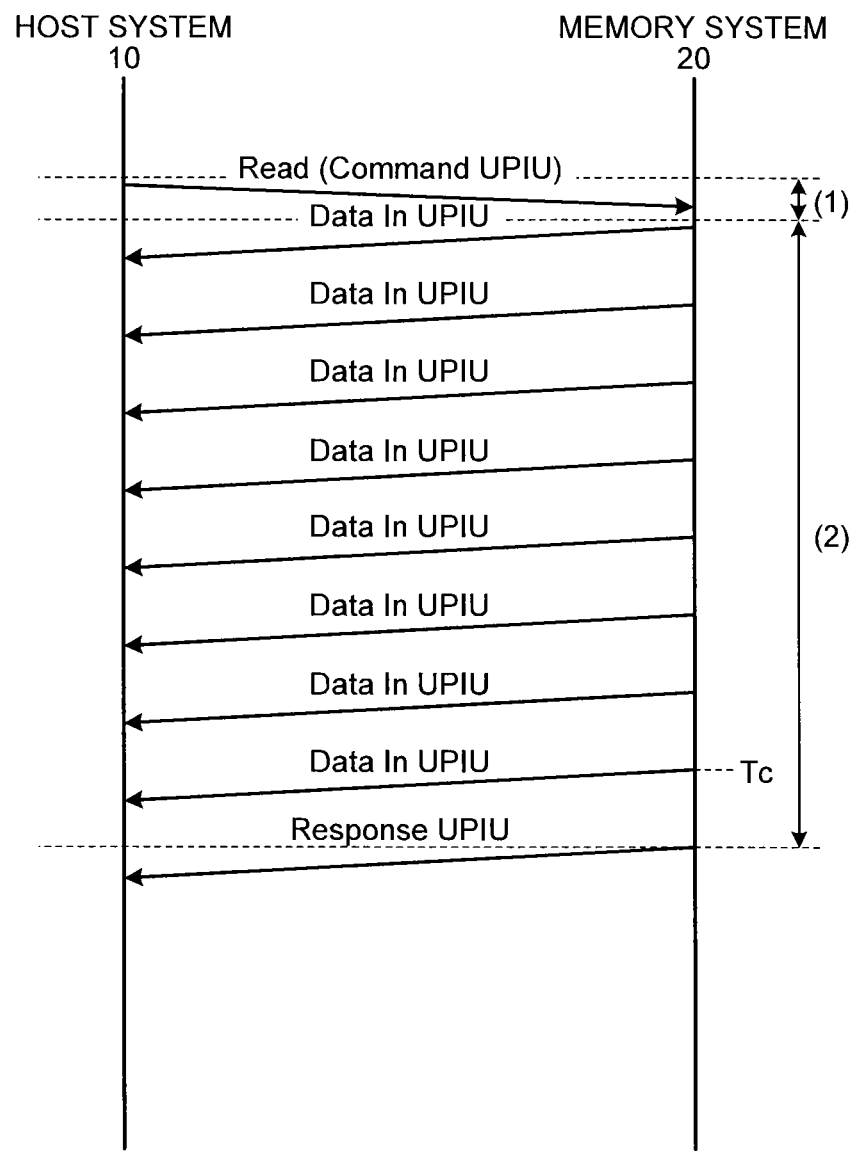
FIG. 5 is a sequence chart illustrating a content of a process according to a read command in the memory system according to the first embodiment.

As illustrated in FIG. 5, the process according to the read command can be roughly divided into two stages. The process according to the read command includes a first process (1) and a second process (2) following thereto. The first process (1) is a process until the transmitting operation to the host system 10 is carried out, and is a process of the transmitting operation to the host system 10 is not carried out. The second process (2) is a process from the start to the completion of the transmitting operation to the host system 10, that is, from the transmission of the first Data In UPIU until the transmission of the Response UPIU to the host system 10, and is a process in which the transmitting operation to the host system 10 is carried out.

In S12 illustrated in FIG. 4, the memory controller 28 can start the first process (1) according to the read command of head LBA=target LBA+X, Size=X. For example, in the case of the target LBA=N, the memory controller 28 starts the first process (1) according to the read command of head LBA=N+X, Size=X. The first process (1) includes a process in which the memory controller 28 acquires the physical address corresponding to the LBA (logical address) requested in the read command from the L2P table 22, and a process in which the memory controller 28 generates a read instruction including the physical address and provides the same to the NAND I/F 24. The first process (1) may further include a process of reading the first read data from the NAND flash 21 and storing the read data in the read buffer 26c. After the first process (1) according to the read command of head LBA=target LBA+X, Size=X is completed, the memory controller 28 waits without starting the second process (2).

When the next command is received (S13) and recognized as being queued in the command queue 26a, the memory controller 28 causes such command to be in an executable state. The memory controller 28 also determines whether or not the next command is the read command of head LBA=target LBA+X, Size=X as predicted in S12 (S14).

If the next command is not the read command of head LBA=target LBA+X, Size=X ("No" in S14), the memory controller 28 stops the process according to the read command of head LBA=target LBA+X, Size=X (S15). In other words, the memory controller 28 discards the result of the first process (1) according to the read command of head LBA=target LBA+X, Size=X. The memory controller 28 then starts the process according to the next command (S10). After the process according to the next command is completed, the memory controller 28 terminates the process.

If the next command is the read command of head LBA=target LBA+X, Size=X ("Yes" in S14), the memory controller 28 starts the second process (2) according to the read command of head LBA=N+X, Size=X. In other words, the memory controller 28 executes the loop of S5 to S7. After the second process (2) according to the read command of head LBA=N+X, Size=X is completed, the memory controller 28 carries out the processes after S8. Thus, the loop process of S8→S11→S12→S13→S14→S5→S6→S7→S8 is repeated while the sequential read access is being carried out.

Figure 6:
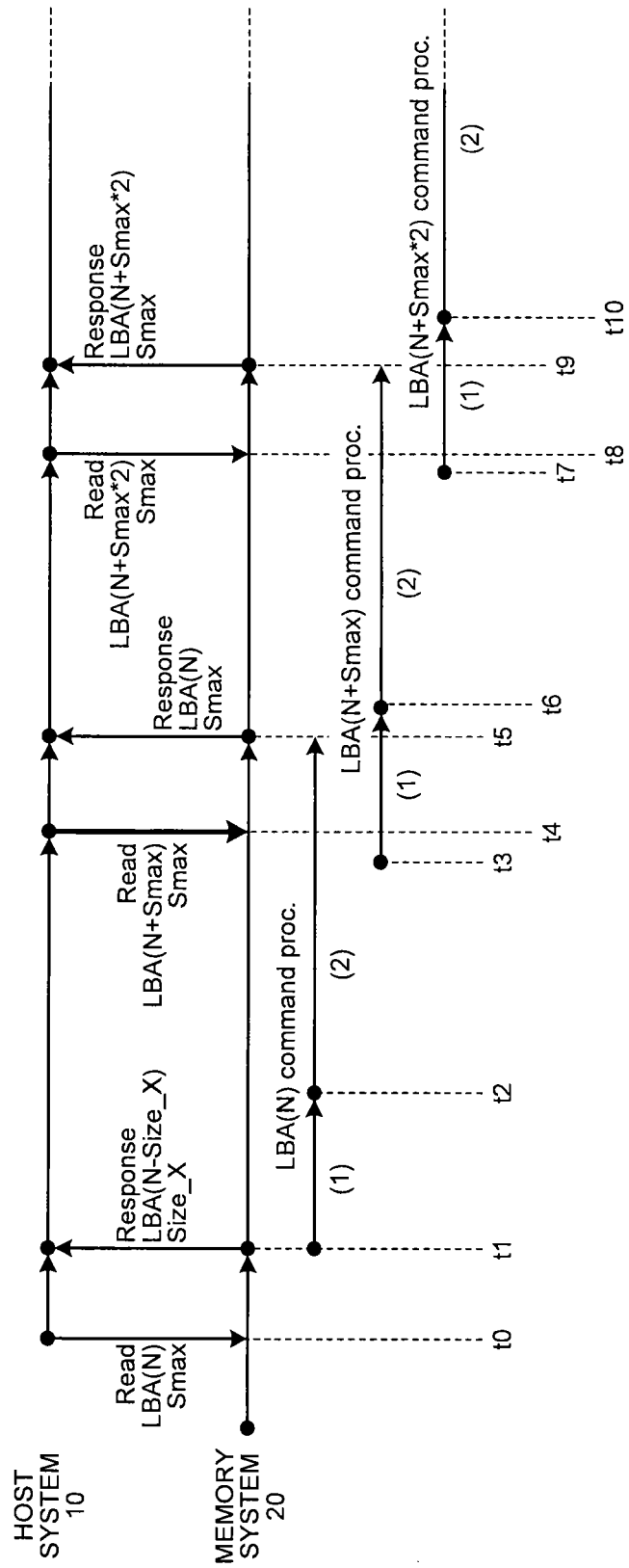
FIG. 6 is a timing chart illustrating an operation of the memory system according to the first embodiment.

Next, an operation example of the speculative execution in the memory system 20 will be described using FIG. 6. FIG. 6 is a timing chart illustrating the operation example of the speculative execution in the memory system 20.

When the sequential read access is carried out, the access of the same size often arrives at the continued LBA regions after reaching the maximum size. Assuming the maximum size of the read access used in the sequential read access is Smax, when the read access having the size Smax to the LBA (N) arrives, the read access to be issued next is predicted to be an access having the size Smax to the LBA (N+Smax). After the process with respect to the read access having the size Smax to the LBA(N) is completed, the read process of the predicted LBA (N+Smax) is speculatively started if the next instruction is not issued.

For example, when receiving the read command of head LBA=N, Size=Smax from the host system 10 at a timing t0 illustrated in FIG. 6, the memory system 20 determines whether the size of the read data requested in the read command matches a predetermined data size. The predetermined data size is a maximum size in the sequential read access.

In accordance therewith, the memory system 20 speculatively executes the read command of head LBA=N+Smax, Size=Smax predicted next at a timing t3 between a timing t2 at which the second process (2) according to the read command of head LBA=N, Size=Smax is started until a timing t5 at which the second process is completed. In other words, at the timing t3, the memory system 20 starts the first process (1) according to the read command of head LBA=N+Smax, Size=Smax predicted next before the next command is received.

It should be noted that the timing t3 can be determined in accordance with the progress status of the second process (2) according to the read command of head LBA=N, Size=Smax. For example, the timing t3 is the timing at which the amount of read data transferred to the read buffer 26c on the memory system 20 reaches a constant amount (total amount of data requested in the read command), and may be the timing the next command check is carried out and the command has not arrived. Such timing is the timing corresponding to a timing Tc illustrated in FIG. 5, for example. In other words, when recognized that the last read data of the read data broken into pieces is transferred from the NAND interface 24, the memory controller 28 starts the first process (1) according to the read command of head LBA=N+Smax, Size=Smax predicted next.

At a timing t4 illustrated in FIG. 6, when receiving the read command of head LBA=N+Smax, Size=Smax as predicted from the host system 10, the memory system 20 determines that the second process (2) according to the read command of head LBA=N+Smax, Size=Smax is executable.

In accordance therewith, the memory system 20 starts the second process (2) according to the read command of head LBA=N+Smax, Size=Smax at a timing t6 immediately after the timing t5 at which the second process (2) according to the read command of head LBA=N, Size=Smax is completed.

Furthermore, at the timing t4, the memory system 20 determines that the size of the read data requested in the read command of head LBA=N+Smax, Size=Smax matches the predetermined data size.

In accordance therewith, the memory system 20 speculatively executes the read command of head LBA=N+Smax*2, Size=Smax predicted next at a timing t7 between the timing t6 at which the second process (2) according to the read command of head LBA=N+Smax, Size=Smax is started until a timing t9 at which the second process is completed. In other words, at the timing t7, the memory system 20 starts the first process (1) according to the read command of head LBA=N+Smax*2, Size=Smax predicted next before the next command is received.

The timing t7 can be determined in accordance with the progress status of the second process (2) according to the read command of head LBA=N+Smax, Size=Smax. For example, the timing t7 is the timing at which the amount of read data transferred to the read buffer 26c on the memory system 20 reaches a constant amount (total amount of data requested in the read command), and may be the timing the next command check is carried out and the command has not arrived. Such timing is the timing corresponding to the timing Tc illustrated in FIG. 5, for example. In other words, when recognized that the last read data of the read data broken into pieces is transferred from the NAND interface

24, the memory controller 28 starts the first process (1) according to the read command of head LBA=N+Smax*2, Size=Smax predicted next.

At a timing t8 illustrated in FIG. 6, when receiving the read command of head LBA=N+Smax*2, Size=Smax as predicted from the host system 10, the memory system 20 determines that the second process (2) according to the read command of head LBA=N+Smax*2, Size=Smax is executable.

In accordance therewith, the memory system 20 starts the second process (2) according to the read command of head LBA=N+Smax*2, Size=Smax at a timing t10 immediately after the timing t9 at which the second process (2) according to the read command of head LBA=N+Smax, Size=Smax is completed.

It should be noted that the memory system 20 transmits the Response UPIU indicating the completion of the process according to the read command to the host system 10 at every timing t1, t5, t9 at which the second process (2) according to the read command is completed.

Therefore, according to the first embodiment, in the memory system 20, if the size of the read data requested in the first read command received by the host interface 29 matches the predetermined data size, the memory controller 28 speculatively executes the process according to the second read command including the logical address sequential to the logical address included in the first read command. The predetermined data size is the maximum size of the read data in the sequential read access. Thus, the memory controller 28 can determine that the read access from the host system 10 is the sequential read access and predict the second read command that arrives next before the command after the first read command is received by the host interface 29 and hence can speculatively execute the process according to the second read command. As a result, in the memory system 20, the time from the reception of the read command until the completion of the process thereof can be reduced compared to when the process according to the read command is started with the reception of the read command from the host system 10 as a trigger. In other words, the processing performance of the read command by the memory system 20 can be enhanced.

According to the first embodiment, in the memory system 20, if the size of the read data requested in the first read command matches the predetermined data size, the memory controller 28 starts the first process (1) according to the second read command including the logical address sequential to the first read command after the first process (1) according to the first read command is completed. In other words, the memory controller 28 starts the first process (1) according to the second read command between the start to the completion of the second process (2) according to the first read command. Thus, the memory controller 28 can speculatively execute the process according to the second read command before the command after the first read command is received.

According to the first embodiment, in the memory system 20, if the size of the read data requested in the first read command matches the predetermined data size, the memory controller 28 starts the first process (1) according to the second read command including the logical address sequential to the first read command in accordance with the progress status of the second process (2) according to the first read command. The memory controller 28 thus can start the speculative execution of the process according to the second read command at an appropriate timing.

It should be noted that, in the memory system 20, the timing the memory controller 28 starts the first process (1) according to the second read command when the size of the read data requested in the first read command matches the predetermined size may be the timing a predetermined period has elapsed from the start of the second process according to the first read command. In other words, the memory controller 28 may start the first process (1) according to the second read command in accordance with the elapse of the predetermined period from the start of the second process according to the first read command when the size of the read data requested in the first read command matches the predetermined data size. In this case, the processing content of the memory controller 28 can be simplified, and the load of the processing of the memory controller 28 can be reduced.

Second Embodiment

The memory system 20 according to a second embodiment will now be described. Hereinafter, portions different from the first embodiment will be centrally described.

In the first embodiment, a case in which the maximum size of the read data in the sequential read access is known is illustrated, but in the second embodiment, a case in which the maximum size of the read data in the sequential read access is not known will be described.

In the sequential read access illustrated in FIG. 3, if the expected maximum size is not known, determination can be made that the read access from the host system 10 to the memory system 20 is the sequential read access when access requests having the same size are continued such as the read command RC4 having Size=128 KB and the read command RC5 having Size=128 KB. When determining that the sizes of the read data requested in the two read commands received continuously match, that is, when determining that the read access from the host system 10 to the memory system 20 is the sequential read access, the memory system 20 starts a routine of determining whether or not to carry out the speculative operation.

For example, when making the sequential read access, the accesses of the same size often arrive in the continued LBA regions after reaching the maximum size. When the read access having size Smax to the LBA(N+Smax) arrives after the read access having size Smax to the LBA(N), the read access to be issued next is predicted to be the access having size Smax to the LBA(N+Smax*2). After the completion of the process with respect to the read access having size Smax to the LBA(N+Smax), the read process of the LBA(N+Smax*2) predicted when the next instruction is not issued is speculatively started.

More specifically, the memory system 20 carries out an operation different from the first embodiment with respect to the following points, as illustrated in FIG. 7. FIG. 7 is a flowchart illustrating the operation of the memory system 20.

In the operation of the memory system 20, the processes of S201 to S206 are carried out in place of the processes of S2 to S6, S8, and S9 (see FIG. 4).

The read command (e.g., read command of head LBA=N, Size=X) received by the memory system 20 via the host I/F 29 is set in the command queue 26a of the buffer memory 26 by the host I/F 29 (S1). When the read command is in the executable state, the memory controller 28 accesses the NAND flash 21 through the NAND I/F 24, and transfers the logical-physical conversion table (L2P table) 22 from the NAND flash 21 to the L2P cache 26b. The memory controller 28 carries out the address resolution using the L2P table 22 transferred to the L2P cache 26b. In other words, the memory controller 28 acquires the physical address corresponded to the LBA (logical address) requested in the read command from the L2P table 22. The memory controller 28 then generates a read instruction including a physical address and provides the same to the NAND I/F 24 for the read data broken into small pieces for every transmittable size with respect to the size of the read data requested in the read command. The NAND I/F 24 reads the read data corresponding to the physical address from the NAND flash 21 and stores the same in the read buffer 26c (S201) in accordance with the read instruction. Thereafter, the memory controller 28 transmits (transfers) the read data stored in the read buffer 26c to the host system 10 via the host I/F 29 (S202).

Here, until all (constant amount) the read data broken into small pieces are transferred to the host system 10 ("No" in S203), the memory controller 28 repeats the readout of the read data (S201) to the read buffer 26c and the transfer of the read data (S202) to the host system 10. When all (constant amount) the read data broken into small pieces are transferred to the host system 10 ("Yes" in S203), the memory controller 28 determines whether or not the next command arrived (S204). If the command is not queued in the command queue 26a, this means that the next command has not arrived ("No" in S204), and hence the memory controller 28 waits for the reception of the next command (S205). If the next command is received and queued in the command queue 26a, the memory controller 28 proceeds to S206. If the command is queued in the command queue 26a, the memory controller 28 proceeds to S206 assuming the next command arrived ("Yes" in S204).

The memory controller 28 causes the next command to be in the executable state, and determines whether the next command is the read command having the logical address sequential to the read command received in S1 and having the same size as the read data (S206). For example, if the read command received in S1 is the read command of head LBA=N, Size=X, whether or not the next command is the read command of head LBA=N+X, Size=X is determined.

If the next command is the read command having the logical address sequential to the read command received in S1 and having the same size as the read data ("Yes" in S206), the memory controller 28 can determine that the read access from the host system 10 to the memory system 20 is the sequential read access. Thus, the memory controller 28 proceeds the process to S5, and causes the process to proceed to the routine of determining (S11) whether or not to carry out the speculative operation (S12). For example, if the read command received in S1 is the read command of head LBA=N, Size=X, and the next command is the read command of head LBA=N+X, Size=X, the first process (1) according to the read command of head LBA=N+X*2, Size=X is speculatively execution started in the speculative operation (S12).

If the next command is not the read command having the logical address sequential to the read command received in S1 and having the same size as the read data ("No" in S206), the memory controller 28 determines that there is a possibility the read access from the host system 10 to the memory system 20 may not be the sequential read access. Thus, the memory controller 28 starts the process according to the next command (S10). After the process according to the next command is completed, the memory controller 28 terminates the process.

As described above, according to the second embodiment, in the memory system 20, if the first read command and the second read command continuously received by the host interface 29 have sequential logical addresses and are requesting for the read data of the same size, the memory controller 28 speculatively executes the process according to the third read command including the logical address sequential to the logical address included in the second read command. In other words, since the first read command and the second read command continuously received by the host interface 29 have sequential logical addresses and are requesting for the read data of the same size, determination can be made that the read access from the host system 10 is the sequential read access and the third read command to arrive next can be predicted, so that the process according to the third read command can be speculatively executed. As a result, when the maximum size of the read data in the sequential read access is not known, the read command to arrive next can be predicted and speculatively executed, so that the time from the reception of the read command until the completion of the process thereof can be shortened. In other words, the processing performance of the read command by the memory system 20 can be enhanced.

Third Embodiment

The memory system 20 according to a third embodiment will now be described. Hereinafter, portions different from the second embodiment will be centrally described.

In the second embodiment, a case of speculatively executing the read command predicted next after the size of the read data in the sequential read access becomes the maximum size has been illustrated, but in the third embodiment, a devisal for predicting the next read command and speculatively executing the same before the size of the read data in the sequential read access becomes the maximum size is considered.

In the sequential read access illustrated in FIG. 3, the size of the read data is known to increase to N times (e.g., two times), and thus if the size of the read data becomes N times (e.g., two times) as in the read command RC1 having Size=16 KB and the read command RC2 having Size=32 KB, determination can be made that the read access from the host system 10 to the memory system 20 is the sequential read access. When determining that an increase rate of the size of the read data requested in the two continuously received read commands matches a predetermined increase rate (N times), that is, the read access from the host system 10 to the memory system 20 is the sequential read access, the memory system 20 starts a routine of determining whether or not to carry out the speculative operation.

For example, the read command to be issued next is predicted by loading an anticipating algorithm of the same algorithm as the OS 13a of the host system 10 on the memory controller 28 of the memory system 20. When the read access having size X*2 to the LBA(N+X) arrives after the read access having size X to the LBA(N), the read access to be issued next is predicted to be an access having size N_X to the LBA(N+X*2). The size N_X is the smaller of the size X*4 or the maximum size Smax. This is because if the size of the read data is the maximum size, the size of the read data does not increase anymore. After the completion of the process with respect to the read access having size X*2 to the LBA(N+X), the read process of size N_X to the LBA (N+X*2) predicted when the next instruction is not issued is speculatively started.

More specifically, the memory system 20 carries out an operation different from the first embodiment with respect to the following points, as illustrated in FIG. 8. FIG. 8 is a flowchart illustrating the operation of the memory system 20.

In the operation of the memory system 20, S301 is carried out between S1 and S201, and the processes of S302 to S306 are carried out in place of the processes of S206, S12, S14, S15 (see FIG. 7).

The read command (e.g., read command of head LBA=N, Size=X) received by the memory system 20 via the host I/F 29 is set in the command queue 26a of the buffer memory 26 by the host I/F 29 (S1). When the read command is in an executable state, the memory controller 28 sets parameters N_LBA, N_X indicating the head LBA and the size of the read data of the read access assumed to arrive next (S301). For example, if the read command received in S1 is the read command of head LBA=N, Size=X, the target LBA+X(=N+X) is set for the parameter N_LBA, and the smaller(=Minimum (2*X, Max_X)) of the 2*X and the Max_X is set for the parameter N_X. The Max_X is the maximum size of the read data in the sequential read access. Thereafter, the memory controller 28 proceeds the process to S201.

In S302, the memory controller 28 determines whether or not the next command is the read command as predicted in S301 (S302). In other words, the memory controller 28 determines whether or not the next command has a logical address sequential to the read command received in S1 and an increase rate of the size of the read data with respect to the read command received in S1 matches a predetermined increase rate (N times, e.g., two times). For example, if the read command received in S1 is the read command of head LBA=N, Size=X, whether or not the next command is the read command of head LBA=N_LBA=N+X, Size=N_X=Minimum(2*X, Max_X) is determined.

If the next command has the logical address sequential to the read command received in S1 and the increase rate of the size of the read data with respect to the read command received in S1 matches the predetermined increase rate (N times, e.g., two times) ("Yes" in S302), the memory controller 28 can determine that the read access from the host system 10 to the memory system 20 is the sequential read access. The memory controller 28 thus proceeds to S5.

If the next command has a logical address sequential to the read command received in S1 and the increase rate of the size of the read data with respect to the read command received in S1 does not match the predetermined increase rate (N times, e.g., two times) ("No" in S302), the memory controller 28 determines that there is a possibility the read access from the host system 10 to the memory system 20 may not be the sequential read access. Thus, the memory controller 28 starts the process according to the next command (S10). The memory controller 28 terminates the process when the process according to the next command is completed.

In S303, the memory controller 28 sets the parameters N_LBA, N_X indicating the head LBA of the read access assumed to arrive next and the size of the read data (S303). For example, if the read command received in S1 is the read command of head LBA=N, Size=X, and the next command is the read command of head LBA=N_LBA=N+X, Size=N_X=Minimum (2*X, Max_X), N_LBA+N_X is set for the parameter N_LBA and the smaller(=Minimum (2*N_X, Max_X)) of 2*N_X and Max_X is set for the parameter N_X. Max_X is the maximum size of the read data in the sequential read access.

In S304, the memory controller 28 speculatively starts the first process (1) according to the read command predicted in S303 (S304). After the first process (1) according to the read command predicted in S303 is completed, the memory controller 28 waits without starting the second process (2).

When the next command is received (S13) and recognized as being queued in the command queue 26a, the memory controller 28 causes such command to be in the executable state. The memory controller 28 also determines whether or not the relevant command is the read command of head LBA=N_LBA, Size=N_X as predicted in S303 (S305).

If the next command is not the read command of head LBA=N_LBA, Size=N_X ("No" in S305), the memory controller 28 stops the process according to the read command of head LBA=N_LBA, Size=N_X (S306). In other words, the memory controller 28 discards the result of the first process (1) according to the read command of head LBA=N_LBA, Size=N_X. The memory controller 28 then starts the process according to the next command (S10). After the process according to the next command is completed, the memory controller 28 terminates the process.

If the next command is the read command of head LBA=N_LBA, Size=N_X ("Yes" in S305), the memory controller 28 starts the second process (2) according to the read command of head LBA=N_LBA, Size=N_X. In other words, the memory controller 28 executes the loop of S5 to S7.

As described above, according to the third embodiment, in the memory system 20, if the first read command and the second read command received continuously by the host interface 29 have sequential logical addresses and the increase rate of the size of the read data requested in the second read command with respect to the size of the read data requested in the first read command matches the predetermined increase rate (N times, e.g., two times), the memory controller 28 speculatively executes the process according to the third read command including the logical address sequential to the logical address included in the second read command. In other words, if the first read command and the second read command have sequential logical addresses and the increase rate of the size of the read data requested in the second read command with respect to the size of the read data requested in the first read command matches the predetermined increase rate (N times, e.g., two times), determination can be made that the read access from the host system 10 is the sequential read access, and the third read command to arrive next can be predicted, so that the process according to the third read command can be speculatively executed. As a result, the read command to arrive next can be predicted and speculatively executed from an early stage before the size of the read data in the sequential read access reaches the maximum size, so that the time from the reception of the read command to the completion of the process thereof can be further shortened. In other words, the processing performance of the read command by the memory system 20 can be further enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory;
a host interface configured to receive a first read command indicating a logical address to access the nonvolatile memory from a host system, the memory system functioning as an external storage device of the host system, the host system accessing the memory system according to an operating system (OS); and
a controller configured to determine whether or not the first read command and a second read command indicating logical addresses top of which is sequential to end of logical addresses indicated by the first read command are sequentially received by the host interface and an increase rate of a size of read data requested in the second read command with respect to a size of read data requested in the first read command matches a predetermined increase rate, the predetermined increase rate being larger than zero, and to execute, when the first read command and the second read command are sequentially received by the host interface and the increase rate of the size of read data requested in the second read command with respect to the size of read data requested in the first read command matches the predetermined increase rate, a process according to a third read command indicating logical addresses top of which is sequential to end of the logical addresses indicated by the second read command before the host interface receives the third read command.

2. The memory system according to claim 1, wherein
when the increase rate of the size of the read data requested in the second read command with respect to the size of the read data requested in the first read command matches the predetermined increase rate and a command after the second read command is not received by the host interface, the controller executes the process according to the third read command before the host interface receives the third read command.

3. The memory system according to claim 1, further comprising:
a command queue, wherein
when the increase rate of the size of the read data requested in the second read command with respect to the size of the read data requested in the first read command matches the predetermined increase rate and a command is not queued in the command queue, the controller executes the process according to the third read command before the host interface receives the third read command.

4. The memory system according to claim 1, wherein
the process according to the read command includes
a first process in which a transmitting operation to the host system is not carried out, and
a second process in which the transmitting operation to the host system is carried out, and
when the increase rate of the size of the read data requested in the second read command with respect to the size of the read data requested in the first read command matches the predetermined increase rate, the controller starts the first process according to the third read command after the first process according to the second read command is completed.

5. The memory system according to claim 1, wherein
when a sequential read access in which a plurality of read commands indicating sequential logical addresses is sequentially received from the host system by the memory system is carried out, the size of the read data requested in the read command is increased in a step wise manner to a maximum size, the size of the read data requested in the read command being maintained at the maximum size after reaching the maximum size, and
the predetermined increase rate is an increase rate of when the size of the read data requested in the read command increases in the sequential read access.

* * * * *